US010259127B2

(12) United States Patent
Bellandi

(10) Patent No.: US 10,259,127 B2
(45) Date of Patent: Apr. 16, 2019

(54) DEVICE FOR CONNECTING PNEUMATIC TOOLS TO A MANIPULATOR

(71) Applicant: GIMATIC S.r.l., Roncadelle (BS) (IT)

(72) Inventor: Giuseppe Bellandi, Roncadelle (IT)

(73) Assignee: GIMATIC S.R.L., Roncadelle (BS) (IT)

(*) Notice: Subject to any disclaimer, the term of this patent is extended or adjusted under 35 U.S.C. 154(b) by 2 days.

(21) Appl. No.: 15/411,076

(22) Filed: Jan. 20, 2017

(65) Prior Publication Data

US 2017/0239823 A1 Aug. 24, 2017

(30) Foreign Application Priority Data

Feb. 23, 2016 (IT) .................. 102016000017762

(51) Int. Cl.
*B25J 19/00* (2006.01)
*F16L 37/46* (2006.01)
(Continued)

(52) U.S. Cl.
CPC ....... *B25J 19/0033* (2013.01); *B25J 15/0408* (2013.01); *B25J 15/0433* (2013.01); *B25J 15/0458* (2013.01); *B25J 15/0625* (2013.01); *F16L 37/252* (2013.01); *F16L 37/46* (2013.01); *Y10S 901/41* (2013.01)

(58) Field of Classification Search
CPC .... B25J 15/04; B25J 15/0408; B25J 15/0433; B25J 15/0458; B25J 15/0425; B25J 19/0033; B25J 15/0625; Y10S 901/30; Y10S 901/41; Y10T 137/87153; Y10T 137/87161; F16K 3/04; F16K 3/08; F16K 11/072; F16K 11/074; F16L 37/252; F16L 37/28; F16L 37/30; F16L 37/32; F16L 37/367; F16L 37/38; F16L 37/4037
See application file for complete search history.

(56) References Cited

U.S. PATENT DOCUMENTS 2,317,827 A * 4/1943 Townhill ............... F16L 37/107
137/614.01
2,399,516 A * 4/1946 Snyder .................... F16L 37/12
137/595
(Continued)

FOREIGN PATENT DOCUMENTS

IT 2012BS00145 A1 4/2014

*Primary Examiner* — Reinaldo Sanchez-Medina
*Assistant Examiner* — David Colon-Morales
(74) *Attorney, Agent, or Firm* — Volpe and Koenig, P.C.

(57) ABSTRACT

A device for connecting pneumatic tools to a manipulator is described. The device includes a main body fixable to a manipulator and provided with seats for corresponding coupling portions of a tool, at least one duct for feeding or suctioning a working fluid to/from the tool, the duct extends in the main body, and an engaging mechanism to engage to tool. The engaging mechanism is movable between a locked position and an unlocked position in order to respectively prevent or allow the detachment of the tool. Advantageously, the engaging mechanism further acts as a valve for opening and closing the duct and is provided with a vent to the atmosphere through which the pressure of the working fluid in the tool is automatically brought to the atmospheric pressure when the engaging mechanism is in the unlocked position.

11 Claims, 5 Drawing Sheets

(51) Int. Cl.
*B25J 15/04* (2006.01)
*B25J 15/06* (2006.01)
*F16L 37/252* (2006.01)

(56) References Cited

U.S. PATENT DOCUMENTS

| | | | | | |
|---|---|---|---|---|---|
| 2,399,525 | A | * | 4/1946 | Waag | F16L 37/367 137/595 |
| 2,403,620 | A | * | 7/1946 | Snyder | F16L 37/12 137/614.01 |
| 2,779,608 | A | * | 1/1957 | Abbey | F16L 37/26 251/149.1 |
| 2,828,146 | A | * | 3/1958 | Abbey | F16K 3/02 137/614.01 |
| 3,092,140 | A | * | 6/1963 | Kenney | B64D 37/005 137/594 |
| 3,229,656 | A | * | 1/1966 | Bodey | B25J 15/04 114/268 |
| 3,821,922 | A | * | 7/1974 | Kouns | F16L 37/367 417/454 |
| 4,409,464 | A | * | 10/1983 | Favareto | B25J 15/04 219/125.1 |
| 4,576,199 | A | * | 3/1986 | Svensson | F16K 27/044 137/614.02 |
| 4,588,504 | A | * | 5/1986 | Berges | F01M 1/10 210/234 |
| 4,763,401 | A | * | 8/1988 | Marinoni | B23K 11/318 279/119 |
| 4,784,421 | A | * | 11/1988 | Alvite' | B25J 15/04 294/119.1 |
| 4,809,747 | A | * | 3/1989 | Choly | B25J 15/04 137/614.06 |
| 4,917,619 | A | * | 4/1990 | Nishiwaki | B23K 9/323 439/191 |
| 5,243,264 | A | * | 9/1993 | Takada | B25J 15/04 318/567 |
| 5,419,354 | A | * | 5/1995 | Krynicki | F16K 17/40 137/1 |
| 5,782,571 | A | * | 7/1998 | Hufford | B25J 15/04 403/288 |
| 6,073,512 | A | * | 6/2000 | McCormick | G05G 1/04 74/527 |
| 6,484,612 | B1 | * | 11/2002 | Miyachi | B25J 15/04 82/158 |
| 7,779,716 | B2 | * | 8/2010 | Dellach | B25J 15/04 414/738 |
| 9,163,766 | B2 | * | 10/2015 | Maffeis | B25J 15/04 |
| 2008/0042432 | A1 | | 2/2008 | Park et al. | |
| 2009/0108224 | A1 | * | 4/2009 | Clasen | F16K 3/085 251/315.04 |
| 2010/0090458 | A1 | | 4/2010 | Schulz et al. | |
| 2014/0102547 | A1 | | 4/2014 | Maffeis | |
| 2015/0267851 | A1 | * | 9/2015 | Aoki | F16L 37/44 251/149.1 |

* cited by examiner

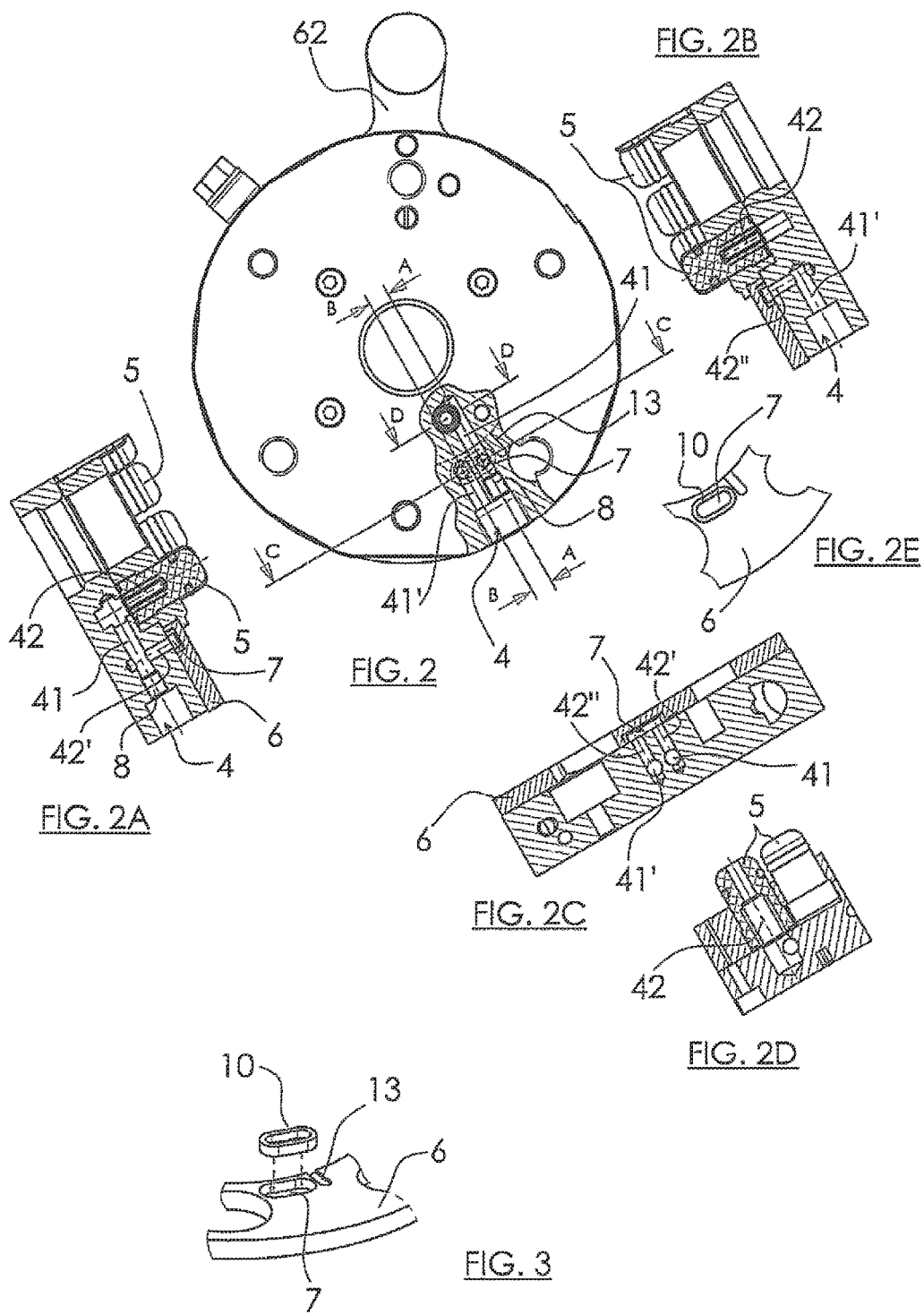

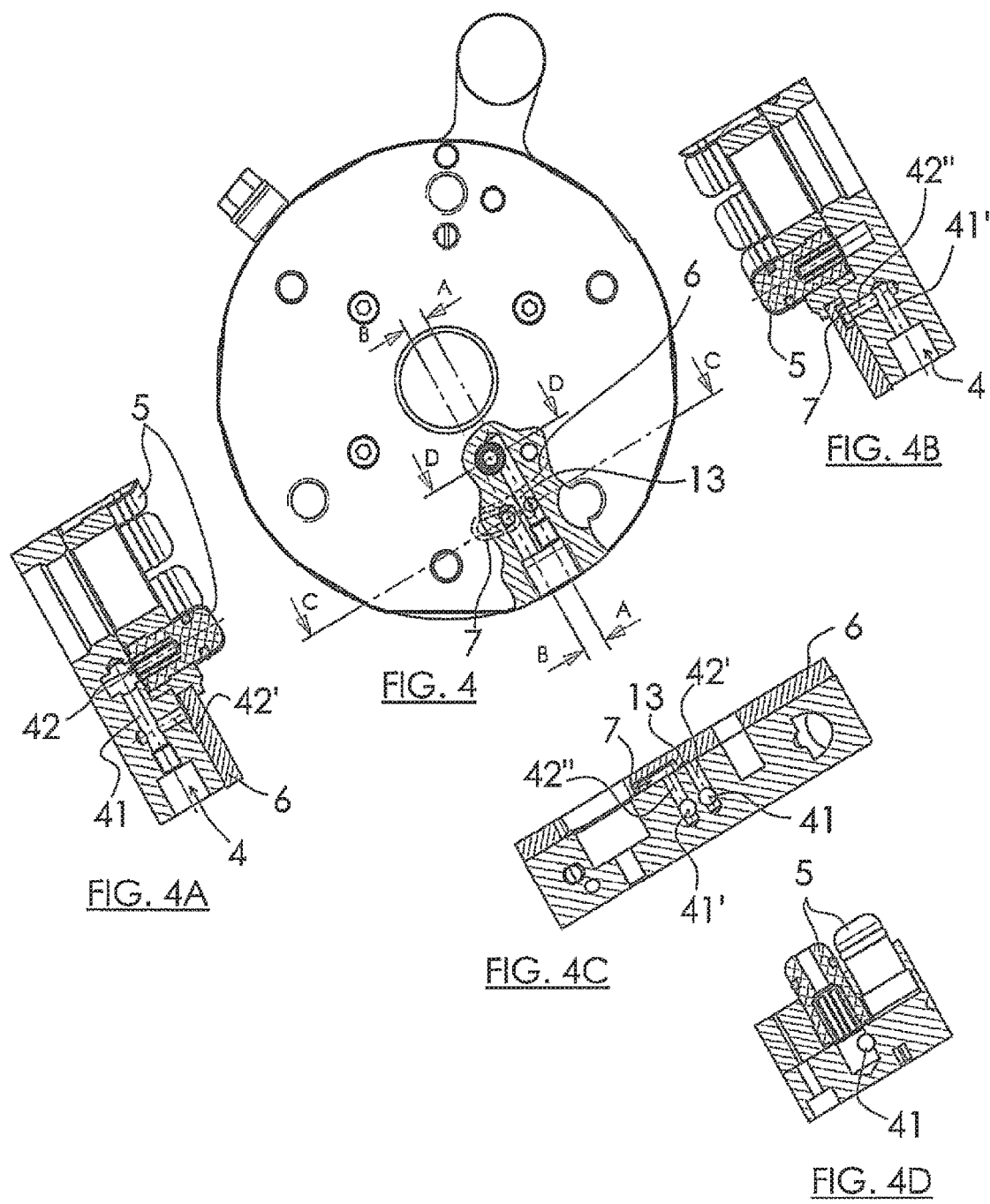

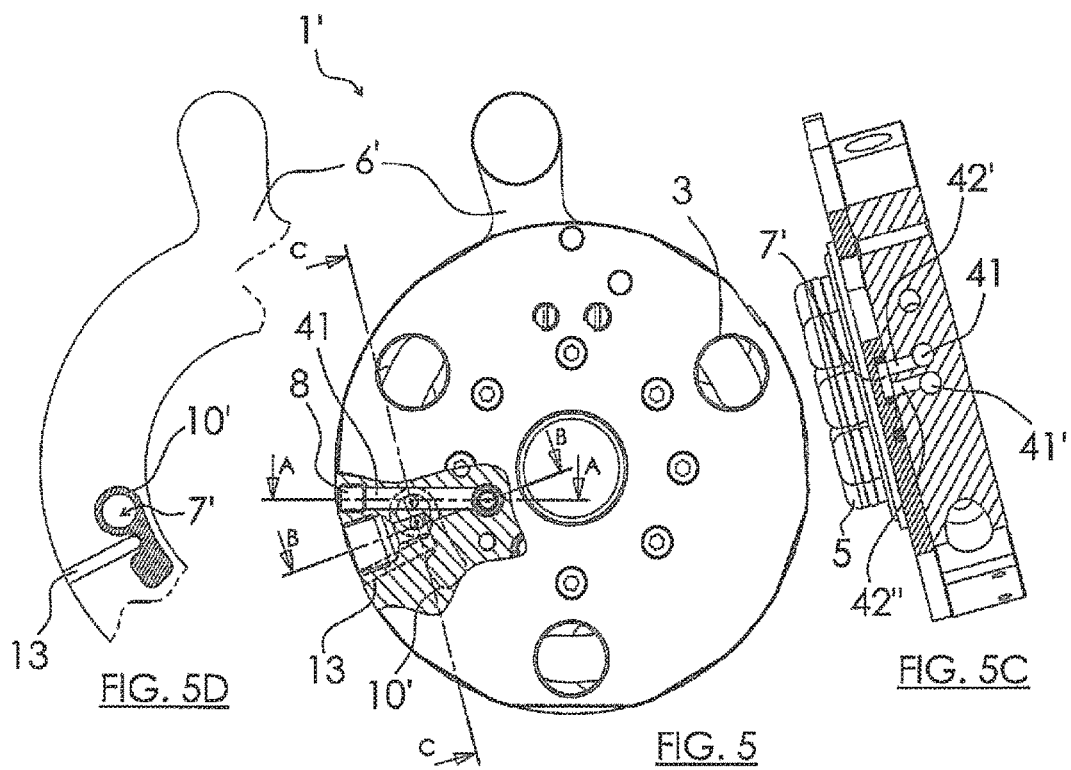
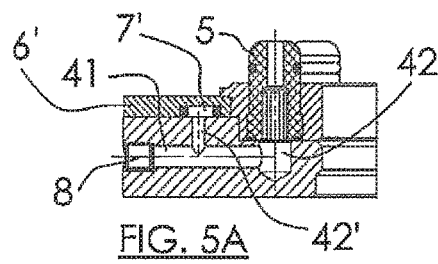
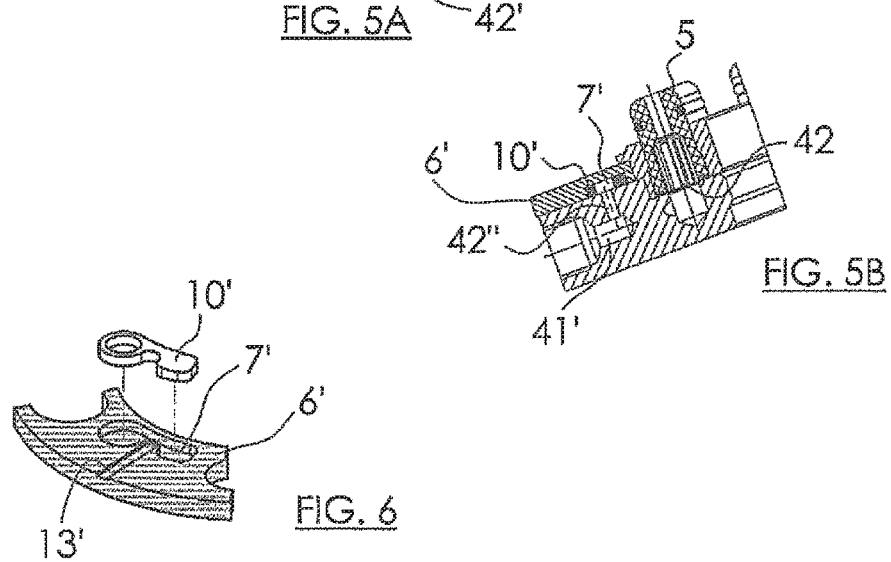

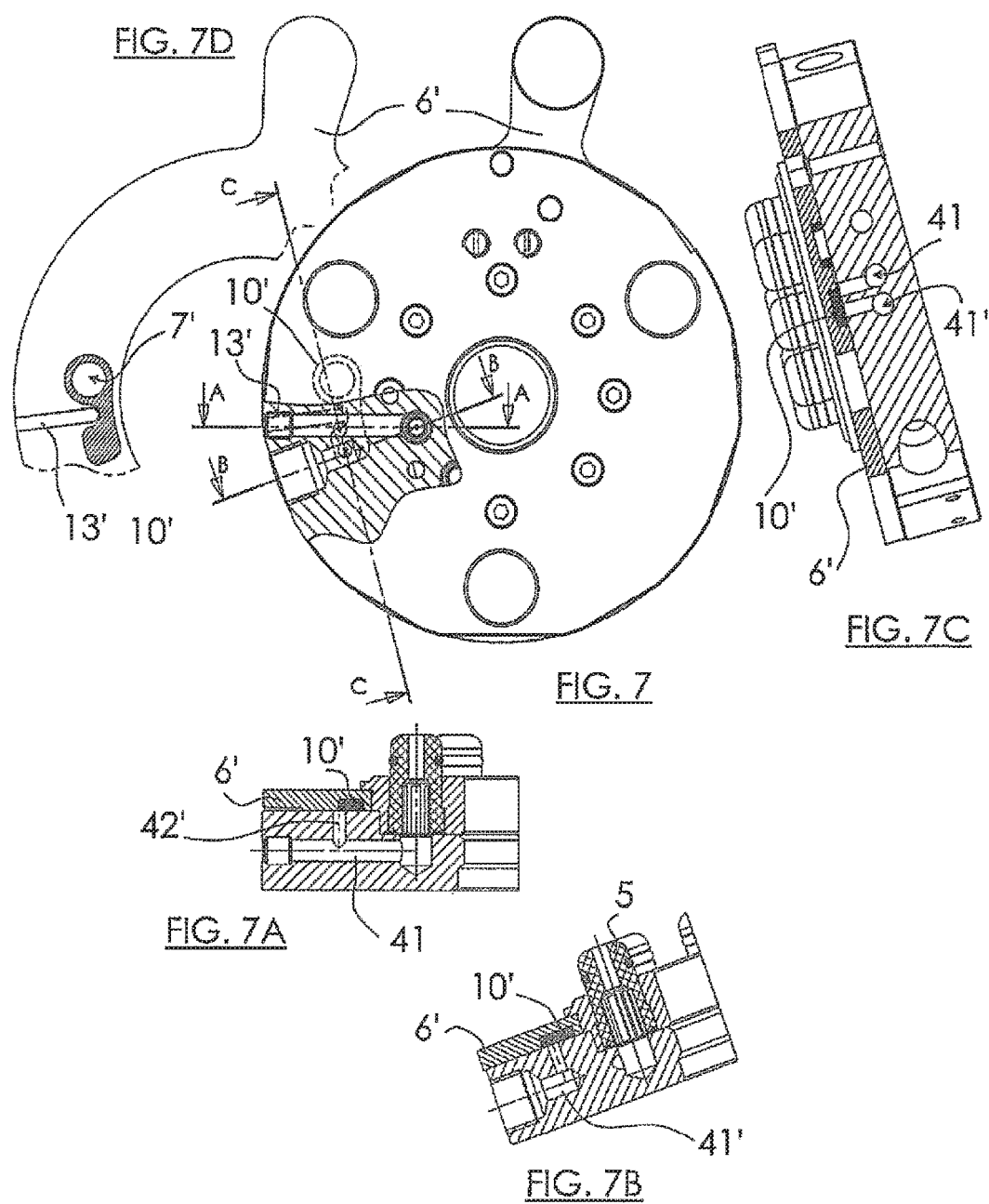

DEVICE FOR CONNECTING PNEUMATIC TOOLS TO A MANIPULATOR

FIELD OF THE INVENTION

The present invention relates to a device for connecting pneumatic tools to a corresponding robotized manipulator.

BACKGROUND

In the field of industrial automation the use of robotic manipulators, such as for example motorized articulated arms, which can be combined with tools intended to act on pieces to be manipulated or processed, is known. Depending on requirements, the tool can thus be a clamp for gripping objects to be manipulated, a pair of pincers, a punch, etc.

In many cases, manipulators are designed to mount interchangeable tools. In this case, connecting devices for the functional connection of each tool to the respective manipulator are generally used.

In general terms, today available connecting devices comprise a body intended to be permanently fixed to the manipulator, for example by screws. The body of the device comprises in turn a plurality of seats for housing corresponding coupling portions of the tool, for example holes for housing pins or clutches of the tool. The device further comprises an engaging mechanism to engage the coupling portions of the tool; this mechanism is movable between a locked position, at which the coupling portions of the tool are locked in the respective seats of the body and cannot disengage therefrom, and an unlocked position, at which the coupling portions of the tool are free to be taken out from the respective seats.

In practice, the connecting device is fixed to the manipulator and the tool can be removably coupled to the body of the device.

Depending on the type of tool to be used, the functional connection to be implemented by the connecting devices may also include electrical, pneumatic, hydraulic connections, etc., for feeding the tool.

Not only must the connecting devices guarantee the proper tool-manipulator functional coupling but they also must allow the tool to be replaced in a way as quick and safe as possible for the inspection staff of the workstation which comprises the manipulator.

For example, in the molding field of plastic manufactured articles, manipulators for gripping, handling and repositioning pieces and/or molds or parts of them are used. The interchangeable tools combined with manipulators generally consist of pneumatically operated clamps.

A typical connecting device broadly used in this and other areas of interest and defining de facto a standard respected by manufacturers, comprises a substantially toroidal body, fixed to the manipulator, equipped with seats for housing corresponding interlocking pins provided on a plate fixed to the tools. The seats are arranged circumferentially around the axis of the body. In a position radially inward with respect to the housing seats, the body comprises a plurality of ducts for feeding compressed air used to operate the tools each time constrained to the device; along these ducts automatic valves for opening and closing the ducts themselves are usually installed. The engaging mechanism to engage the tool pins is a circular lock ring provided with through openings each consisting of a substantially circular hole joined to an eyelet whose width is less than the diameter of the circular hole. The lock ring is coaxial with the body and is superimposed thereto so that each through opening intercepts a corresponding housing seat. The lock ring can be manually rotated between a first unlocked angular position, at which the circular holes are aligned with the accommodating seats and the tool pins can be inserted into or taken out from the respective seats respectively for constraining or disengaging the tool to/from the device, and a second locked angular position, at which the eyelets are aligned with the accommodating seats and lock the tool pins at a section thereof having reduced diameter, so as to prevent the tool from disengaging from the connecting device.

In practice when a tool needs to be replaced, the operator acts on the engaging mechanism, i.e. he/she rotates the lock ring to move the relative holes into alignment with the accommodating seats of the pins of the tool mounted on the device. In this way, the tool can be separated from the device and thus from the manipulator, so as to leave space for another tool. The automatic valves are kept open by the tool that presses against them while still constrained to the connecting device. When the tool is physically separated from the device, the automatic valves act to close the feed of compressed air in the respective ducts.

A prior art device is described in US 2008/0042432. A set of connecting devices according to the known art is also commercialized by the Applicant under the name of "cambia-utensile automatico per robot QC-Series" ("automatic tool-replacer for QC-Series robots").

An important drawback of the described connecting devices lies in the fact that the automatic valves act too late in closing the feeding of compressed air when the tool is separated from the device. In practice, even when the operator moves the lock ring to the unlocked position to release the tool, the compressed air continues to be fed and is sufficient to keep the same tool active, for example is sufficient to keep open the jaws of a pneumatic clamp. Only after the tool has been separated from the device, the residual compressed air in the tool inevitably is discharged in the atmosphere and usually causes the tool to be disabled. Referring again to the example of the pneumatic clamp, the jaws close all at once, evidently putting at risk the safety of the operator handling the tool.

Workers may be injured even seriously by some tools. Even if the tool is activated by means of pneumatic vacuum, rather than by compressed air, the same drawback can be found. In this case, as a result of the separation of the tool from the connecting device, the pressure in the tool itself is immediately recovered and the latter is instantaneously disabled.

Another drawback of conventional solutions is that the compressed air fed to the connecting device can apply a thrust counteracting the coupling, or the detachment, of the tool to/from the device itself. The greater the number of ducts supplied with compressed air, the more apparent this circumstance.

Therefore, the Applicant proposed the solution described in the Italian Patent IT 1413748 (Application No. 102012902091284, ex BS2012A000145) and marketed under the name QCX, QCX90-A to QCX200-A series; it is a connecting device comprising:

a) a body, fixable to a manipulator, provided with one or more seats for accommodating corresponding coupling portions of a tool, for example holes for accommodating corresponding interlocking pins of the tool;

b) one or more ducts for feeding or suctioning a working fluid to/from the tool, for example compressed air or vacuum, wherein the ducts pass through at least part of the device body;

c) an engaging mechanism to engage the coupling portions of the tool, wherein the engaging mechanism can be activated for locking and unlocking the coupling portions of the tool respectively in/from the corresponding accommodating seats of the device body;

d) closing means to close the feeding/suctioning ducts, mounted in or on the device body, wherein said closing means are designed to automatically close the feeding/suctioning ducts before the engaging mechanism, once activated, unlocks the tool from the device.

The closing means are independent from the tool, meaning that the activation of the closing means does not necessarily depend on whether the tool is present on the device or not.

Preferably, the working fluid is compressed air, but alternatively it can also be oil, pneumatic vacuum, etc.

The above mentioned characteristic d) is very important for safety at workplaces, as it allows the prevention of injury of the operator employed in replacing the tools each time combined with the device. Since the closing means are always activated adequately in advance with respect to the engaging mechanism moving to the unlocked position of the tool, the rapid decompression (if the working fluid is compressed air) or pressurization (if the tool is activated by pneumatic vacuum) of the tool, usually occurring at the separation from the traditional connecting devices, is thus prevented.

In other words, thanks to closing means automatically activated by the engaging mechanism when the engaging mechanism is moved to the unlocked position, the tool, as it is separated from the connecting device for the replacement with another tool, can be prevented from being undesirably activated or disabled. The benefits for the safety of workers are obvious.

The closing means function as a tap which, if necessary, stops the flow rate of the working fluid, fed or suctioned, upstream of the tool.

Being able to stop feeding the working fluid gives the further advantage that the working fluid cannot impede the coupling or the detachment of the tool to/from the device, as is the case in traditional solutions using compressed air, as described above.

Referring again, for simplicity, to the example previously made in which the connecting devices are used to support pneumatic clamps, the closing means of the feeding ducts are operable to stop feeding compressed air before the clamp is separated from the device itself. This prevents compressed air from building up in the tool before the latter is actually separated from the device. As a result, the tool does not depressurize all at once and therefore the jaws do not snap close, or open (depending on the case), when the operator handles the clamp.

The activation of the engaging mechanism is kinematically contingent on the activation of the closing means, meaning that these components are designed to interact in such a way that the closing means intervene to close the feeding of working fluid before the tool can be disconnected from the device.

Although the device according to the Italian patent IT 1413748 achieved an excellent result, the Applicant found that there is still room for the improvement thereof. In particular, the connecting device described in IT 1413748 provides two separate handles for operating the closing means and the engaging mechanism, respectively, these handles being referred to with numerals 82 and 72 in the drawings, although users are accustomed to use only one of them. Moreover, the presence of the two handles 72 and 82, which in turn control the circular lock ring 7 and the plate 8, causes the axial dimension of the device to be slightly greater than solutions without a system for closing the pneumatic lines, whereas users want the overall dimensions of the device to be kept as small as possible.

SUMMARY

It is an object of the present invention to provide a connecting device to connect pneumatic tools to manipulators, the device allowing the drawbacks of known solutions to be overcome while being easy to be manufactured and used, safe for operators and not too bulky in height, and in particular improving the solution described in document IT 1413748, even as regards production costs.

Therefore, the present invention concerns a connecting device.

In particular, the device comprises:

a) a main body, fixable to a manipulator such as a robotic arm, provided with one or more seats for accommodating corresponding coupling portions of a tool, for example holes in which corresponding pins of the tool, or of a tool-holder plate, can be inserted;

b) at least one duct for feeding or suctioning a working fluid to/from the tool, wherein the duct extends through the main body of the device and is intended to be coupled to lines for feeding the working fluid or suctioning the working fluid; and c) an engaging mechanism to engage the coupling portions of the tool, wherein the engaging mechanism is movable with respect to the main body between a locked position, at which the coupling portions of the tool are locked in the corresponding accommodating seats, and an unlocked position, at which the coupling portions of the tool are free to disengage the corresponding accommodating seats of the main body.

Unlike traditional solutions, advantageously in the device according to the present invention the engaging mechanism further acts as a valve for opening and closing the duct (or the ducts if more than one) in which the working fluid flows, and is provided with means for venting into the atmosphere through which the pressure of the working fluid in the tool is automatically brought to the atmospheric pressure when the engaging mechanism is in the unlocked position.

In other words, in the locked position the engaging mechanism keeps the duct pneumatically open, so that the tool can operate properly without being subject to undesired depressurization (or pressurization if it works with vacuum), whereas in the unlocked position the engaging mechanism prevents the passage of the working fluid in the duct and connects the tool with the atmosphere, by means of a vent, in order to achieve the deactivation of the tool before the latter is disconnected from the device.

The proposed solution is based on the concept of preventing the operator employed in replacing the tool from being injured when he/she removes the tool from the device. For example, if the tool is operated by compressed air, the engaging mechanism stops the feed of compressed air by closing the feeding duct or ducts, and configures a vent to atmosphere for the residual compressed air in the tool before the operator can take the tool. In this way, compressed air is allowed to flow out of the tool and discharge into the atmosphere, thus making the tool itself not dangerous. For example, in the case of pneumatic clamp, the respective jaws will not be able to open or close all at once and injure the operator, precisely because the compressed air is discharged into the atmosphere before the tool can be separated from the device.

The proposed solution provides several advantages.

Firstly, the device is simple to be used: the operators employed in replacing the tool only have to operate the engaging mechanism and not other mechanisms in order to control the flow of working fluid from and to the tool. The deactivation of the tool takes place automatically by actuating the engaging mechanism.

Secondly, precisely thanks to the engaging mechanism also acting as a discharge valve, the device can be made with minimum axial dimensions. In order to achieve the deactivation of the tool, the device does not require to be provided with further components, such as those described in IT 1413748: no further plates acting as taps are needed, but the engaging mechanism carries on this function by itself.

Minimized overall dimensions also result in contained weights, and this is a very important aspect considering inertia caused by the device to robotic arms during the relative movements.

Furthermore, by closing the ducts, the exposure to resistance of the working fluid when a tool is coupled or uncoupled to/from the device is prevented.

In general, the engaging mechanism can be either manual, i.e. whose operation is controlled by the operator, for example by means of a corresponding lever, or automatic, i.e. whose operation is controlled by the robotized station of the respective manipulator.

In the preferred embodiment at least one duct splits in two branches. A first branch communicates with the tool constrained to the device but does not communicate with any outside line feeding or suctioning the working fluid. A second branch communicates with an outside line feeding or suctioning the working fluid but does not communicate with the tool. Also the further function of connecting the two branches of the duct when needed, as a valve, is carried out precisely by the engaging mechanism. In fact the engaging mechanism, mounted on the main body and movable with respect thereto, is provided with a passage that fluidically connects the two branches of the duct automatically, or isolates them, when the engaging mechanism is in the locked or unlocked position, respectively.

Preferably, per each duct the engaging mechanism comprises a niche, or compartment, obtained at a face thereof directed to the main body of the device. The niche extends along an arc of a circle and obviously moves along with the engaging device. In the locked position the niche intercepts both the branches of the duct which, for this reason, are provided with lengths opening at the face of the main body directed to the engaging mechanism—thereby allowing the fluidic communication between them and allowing the working fluid to feed the tool constrained to the device, or else allowing the air to flow out of the tool, if the tool works with vacuum. In the unlocked position the niche does not intercept at least one of the two branches, or does not intercept any branch of the respective duct; therefore the passage of the working fluid is prevented. In the unlocked position of the engaging mechanism the latter provides a vent in the atmosphere for the working fluid in the tool.

Preferably, the engaging mechanism is a lock ring assembled on the main body and provided, per each accommodating seats provided in the device body, with through openings each consisting of a substantially circular hole joined to an eyelet whose width is lower than the diameter of the circular hole. A corresponding coupling pin of the tool can be inserted in each hole of the lock ring, but it cannot be inserted through the eyelet. As described above, the lock ring can be rotated between:

the unlocked position, at which the respective holes are aligned with the accommodating seats and the interlocking pins of the tool (or the tool-holder plate) can be inserted/ released respectively to engage and disengage the tool to/from the device, and the locked position, at which the eyelets are aligned with the accommodating seats to engage a narrowing section of the coupling pins of the tool and to lock them just in the accommodating seats, so as to prevent the tool from being disengaged from the device.

Preferably, between the niche and the corresponding duct there is provided a sealing gasket.

In the preferred embodiment of the device according to the present invention, the main body is toroidal or disc-shaped, and extends along a longitudinal axis corresponding to the alignment axis of the tool with respect to the device itself. Each feeding duct comprises a transversal, radial or nearly radial length joined to an axial length, wherein the transversal length opens towards the outside of the main body and the axial length opens towards the tool or towards a nozzle of the type used to feed the tools. Each duct comprises:

a first branch defined by a first length transversal or skew with respect to the longitudinal axis and closed to the atmosphere and by a second axial length opening to the tool or to a nozzle, and a second branch defined by a first length skew or transversal with respect to the longitudinal axis and open towards a line feeding or suctioning the working fluid and by a second axial length leading at the surface of the main body facing the locking means, i.e. the lock ring.

Preferably, both the branches are obtained by boring the main body of the device; the first branch is closed during the assembling step, for example by a grub screw, a sealant, a screw or a metal bead.

The skilled person will understand that if there are more than one split ducts, the engaging mechanism is designed so as to act as a valve for opening and closing every duct.

Preferably, the lock ring is provided with a groove obtained in the face directed to the main body, i.e. the face intended to remain in abutment against the main body when the lock ring is rotated. The groove is a channel for the working fluid and leads laterally at the inner edge or the outer edge of the lock ring. The groove extends for a length sufficient to fluidically connect the atmosphere to a length of the duct for feeding the working fluid which leads at the face of the main body facing the lock ring. In practice, the groove together with the main body define a vent that rotates with the lock ring. In the unlocked position of the lock ring, the vent intercepts the first branch of the duct for feeding the working fluid in order to allow atmospheric pressure and pressure in the tool to be equalized. In the locked position of the lock ring the vent is inactive, not intercepting any branch of the duct.

BRIEF DESCRIPTION OF THE DRAWINGS

Further characteristics and advantages of the invention will be more evident by the review of the following specification of a preferred, but not exclusive, embodiment, which is depicted for illustration purposes only and without limitation, with the aid of the attached drawings, in which:

FIG. 2 is a front and partially sectional view of the device shown in FIG. 1, in a first configuration;

FIG. 2A is a partial cross-sectional view considered on the plane A-A of FIG. 2;

FIG. 2B is a partial cross-sectional view considered on the plane B-B of FIG. 2;

FIG. 2C is a partial cross-sectional view considered on the plane C-C of FIG. 2;

FIG. 2D is a partial cross-sectional view considered on the plane D-D of FIG. 2;

FIG. 2E is a partial plan view of a detail of the device shown in FIG. 1;

FIG. 3 is a partial perspective view, partially exploded, of a detail of the device shown in FIG. 1;

FIG. 4 is a front and partially sectional view of the device shown in FIG. 1, in a second configuration;

FIG. 4A is a partial cross-sectional view considered on the plane A-A of FIG. 4;

FIG. 4B is a partial cross-sectional view considered on the plane B-B of FIG. 4;

FIG. 4C is a partial cross-sectional view considered on the plane C-C of FIG. 4;

FIG. 4D is a partial cross-sectional view considered on the plane D-D of FIG. 4;

FIG. 5 is a front and partially sectional view of a second embodiment of the device according to the present invention, shown in a first configuration;

FIG. 5A is a partial cross-sectional view considered on the plane A-A of FIG. 5;

FIG. 5B is a partial cross-sectional view considered on the plane B-B of FIG. 5;

FIG. 5C is a partial cross-sectional view considered on the plane C-C of FIG. 5;

FIG. 5D is a partial schematic view of a detail of the device shown in FIG. 5;

FIG. 6 is a partial perspective view, partially exploded, of a detail of the device shown in FIG. 5;

FIG. 7 is a front and partially sectional view of the device shown in FIG. 1, in a second configuration;

FIG. 7A is a partial cross-sectional view considered on the plane A-A of FIG. 7;

FIG. 7B is a partial cross-sectional view considered on the plane B-B of FIG. 7;

FIG. 7C is a partial cross-sectional view considered on the plane C-C of FIG. 7;

FIG. 7D is a partial plan view of a detail of the device shown in FIG. 7.

DETAILED DESCRIPTION OF THE PREFERRED EMBODIMENTS

Figure 1:
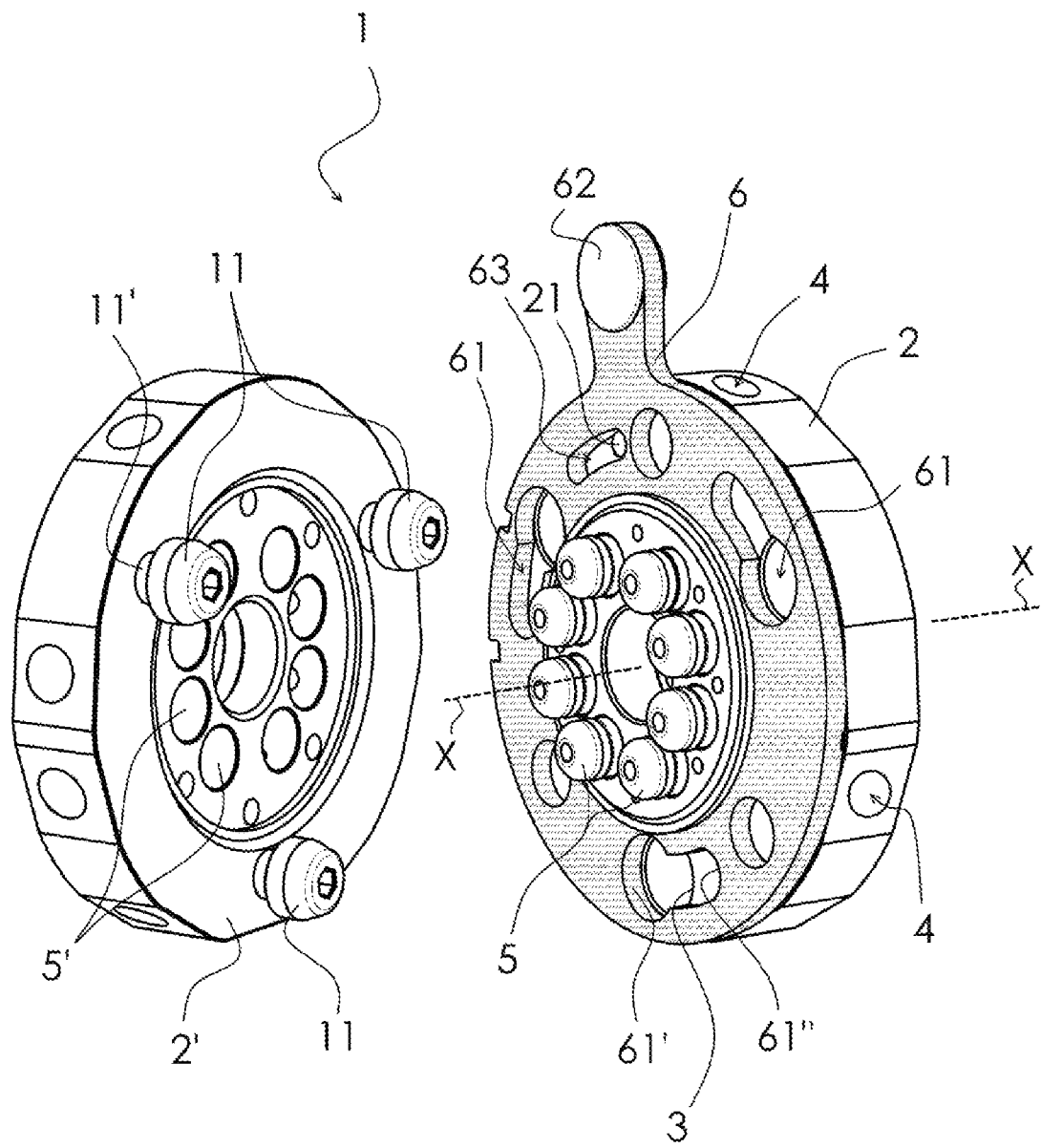
FIG. 1 is a perspective view of a first embodiment of the connecting device according to the present invention, frontally shown.

FIGS. 1-4D show a first embodiment of the present invention, relating to a connecting device 1 for connecting tools (not shown) to a manipulator (not shown).

FIGS. 5-7D show a second embodiment 1' of the present invention.

The device 1 has the function of allowing interchangeable tools to be assembled on the manipulator, and allowing rapid and safe tool change.

Referring particularly to FIGS. 1 to 4D, the device 1 comprises a main body 2 toroidally shaped that extends along a longitudinal axis X-X. This axis is also the alignment axis of the tool to the device 1. The main body 2 is intended to be fixed to a manipulator, such as a robotic arm; a tool-holder plate 2' removably constrainable to the main body 2 according to procedures known in the art, is intended to support interchangeable tools, meaning that the tools are anchored each time to the tool-holder plate 2' which can be fastened to the body 2 and released therefrom to release the tool.

The tool-holder plate 2' is provided with a plurality of pins 11 and the main body 2 is provided with a corresponding number of through or blind holes 3 (three in the example shown in figures), in which the pins 11 are intended to be slidingly inserted. The holes 3 are arranged in a circular configuration around the axis X-X; in the figures they are arranged at 120° around the axis X-X.

The main body 2 is provided with a plurality of ducts 4 whose initial length 41 extends in radial direction, i.e. orthogonal with respect to the axis X-X and towards it, whose second length 42 then extends axially, i.e. parallel and around the axis X-X, in order to feed corresponding nozzles 5. The path of the ducts 4 is clearly visible in FIGS. 2 to 2D. The lengths 41 and 42 are formed by boring the main body 2.

The ducts 4 can be each connected to a corresponding line for feeding or suctioning the working fluid and have the function of conveying the working fluid to the tool supported by the device 1. Hereinafter, for convenience sake reference will be made to compressed air, having however care to consider that the working fluid can be of different nature, or it can be even pneumatic vacuum, i.e. suctioned air.

Therefore, the nozzles 5 are positioned along the axial length 42 of the ducts 4 and have the function to fit in corresponding seats 5' obtained in the tool-holder plate 2' in order to configure a pneumatic connection. For this reason, they are provided outside with a sealing gasket of O-ring type.

A circular lock ring 6, provided with a plurality of through openings 61 and a control lever 62, is housed on the main body 2. Each of the through openings 61 corresponds to one of the housing holes 3 of the pins 11 of the tool. The shape of the openings 61 corresponds to a circular hole 61' joined to an eyelet 61" whose width is less than the diameter of the hole 61'. The pins 11 are sized so as to be able to be inserted through the hole 61' but not through the eyelet 61".

The lock ring 6 is coaxial with the main body 2 and is rotatable with respect to it between:

an unlocked position, at which the pins 11 of the tool can be freely inserted and released into/from the holes 3 through the holes 61, and a locked position, at which the holes 61 are angularly misaligned with respect to the holes 3 which are instead intercepted by the eyelets 61"; the eyelets 61" tighten a narrowing section 11' of the interlocking pins 11 of the tool, thereby locking them in the holes 3.

For example, the locked and unlocked positions of the tool define a center angle of about 15°.

The lock ring 6 comprises a cam 63 interacting with the pawl 21 of the main body 2. The cam 63 together with the pawl 21 define the stops of the limit angular positions of the lock ring 6.

Therefore the lock ring 6 defines an engaging mechanism of the pins 11 of the tool in that it has the function of locking them or allowing them to be selectively extracted from the holes 3.

In the shown embodiment the lock ring 6 is manually caused to rotate by the operator by means of the lever 62.

When the lever 62 is moved to the unlocked position, the tool can be released from the device 1 and the nozzles 5 can be extracted from the respective seats 5' of the tool-holder plate 11. At this point, in the solutions according to the known art when the operator separates the tool, the compressed air possibly remained trapped inside it is suddenly discharged into the atmosphere, with the above described risks.

Unlike traditional solutions, in the device 1 according to the present invention the lock ring 6 has the further function of discharging the compressed air into the atmosphere before the tool is separated from the device 1, as will now be described.

FIG. 2 shows, in plan view, the rear face of the device 1. The section planes A-A, B-B, C-C and D-D are depicted by dotted lines. Furthermore, only one detail is shown inside the body 2, in a cross-section taken on a plane orthogonal to the axis X-X; in particular, a duct 4 is shown.

The duct 4 feeds compressed air to a corresponding nozzle 5 and consists of a first transversal length 41, a first axial length 42 coaxial with the respective nozzle 5 and a second axial length 42' parallel to the length 42, but does not feed any nozzle 5 and opens at the surface of the body 2 on which the lock ring 6 is in abutment and rotates.

The duct 4 shown in the figures splits in two branches. In more detail, in addition to the above described lengths 41, 42 and 42', the duct 4 also comprises a further transversal length 41' named by-pass length, and the corresponding axial portion 42" that, as the portion 42', does not supply any nozzle 5 but simply opens at the surface of the body 2 in contact with the lock ring 6.

The lengths 41 and 41' of the duct 4 are parallel and nearly radial, but may also be skewed with respect to the longitudinal axis X-X. The second axial length 42" intercepts the transversal length 41' approximately in the middle of its length.

In practice, a first branch of the duct 4 is defined by the lengths 41, 42 and 42' and a second branch is defined by the lengths 41' and 42".

The length 41' of the duct 4 is closed during the assembling step, by the manufacturer, with a grub screw 8 or alternatively with a metal bead, a weld, a sealant, etc. In other words, the first branch of the duct 4 is not open for the passage of compressed air (or vacuum), i.e. is not directly connected to a line feeding compressed air. On the contrary, the second branch is directly connected to a line feeding compressed air, because the by-pass length 41' leads to the outer surface of the main body 2, but is not connected to any nozzle 5 and therefore to the tool possibly constrained to the device 1.

By observing the figures, it can be noticed that downstream of the grub screw 8, that is, between the grub screw 8 and the axial length 42, the transversal length 41 is not directly communicating with connected the by-pass length 41'.

Referring again to FIGS. 2 to 3, at the face directed to the main body 2, the lock ring 6 has a niche, or compartment 7, which extends along an arc of a circle. Preferably a gasket 10 is inserted in the niche 7.

It is precisely the lock ring 6 which has the task of fluidic communication of the lengths 42' and 42", and therefore the lengths 41 and 41' of the duct 4.

FIGS. 2 to 2D show the device 1 with the lock ring 6 in the locked position, i.e. in the position in which the pins 11 cannot be extracted from the holes 3 of the device 1 and the tool remains anchored. It is a limit position of the lock ring 6. In this position it is useful feeding compressed air to the tool, but this cannot be done simply by delivering compressed air to the first branch of the duct 4. In fact, as will now be described, the two branches of the duct 4 and the lock ring 6 are required to interact to each other. As shown in figures, the niche 7 fluidically connects the axial length 42' to the axial length 42", i.e. fluidically connects the two branches of the duct 4. In particular, in FIG. 2 the niche 7 is shown in dotted lines. This allows compressed air to be fed to the nozzle 5; the path traveled by the compressed air, with reference to lengths involved, is in this order: 41', 42", 42', 41, 42 until the nozzle 5.

In practice, in the locked position of the lock ring 6, the respective niche functions as pneumatic connection that fluidically connects the two branches of the duct 4.

FIGS. 4 to 4D show the device 1 with the lock ring in the unlocked position, i.e. in the position in which the pins 11 can be extracted from the holes 3 of the device 1 in order to separate the tool. By rotating the lock ring 6 from the locked to the unlocked positions (compare FIGS. 2 and 4), the niche 7 moves angularly with respect to the duct 4 up to the position best shown in FIGS. 4 and 4C, in which the niche 7 intercepts only the length 42" but not the length 42', which therefore remains isolated. In this way, the feed of compressed air feed to the nozzle 5 stops. In practice the niche 7 closes the feed of compressed air as a tap.

The reader's attention is now directed to the groove 13 obtained in the lock ring 6 and visible in FIGS. 3, 4 and 4C. The groove 13, defined as by-pass groove, opens at the inner edge of the lock ring 6, i.e. it extends radially towards the nozzles 5 so as to fluidically connect to the atmosphere the surface of the lock ring 6 which is in abutment against the body 2.

As mentioned, during the rotation of the lock ring 6 from the locked to the unlocked positions, the niche 7 gradually stops the feed of compressed air to the first branch of the duct 4, until the complete closure is achieved. Simultaneously, the surface countersink 13 moves until being at the length 42' of the first branch of the duct 4, thereby fluidically connecting it to the atmosphere. This allows compressed air still present in the tool to be discharged into the atmosphere through the nozzle 5 and the length 42', before the lock ring 6 reaches the unlocked position, or alternatively allows the compressed air to be abruptly discharged when the lock ring 6 reaches this position.

In other words, the position of the niche 7 and the position of the surface countersink 13 on the lock ring 6 are designed to allow compressed air to be vented into the atmosphere (or the vacuum to be recovered) before the tool-holder plate 2', and thus the tool itself, can be detached from the device 1, thus preventing the risks described above and without adopting the second ring described in Italian patent IT 1413748.

The equalization of the pressure inside the tool with the atmospheric pressure is practically immediate when the lock ring 6 reaches the unlocked position. This causes the deactivation of the tool, for example the jaws of a pneumatic clamp to be disabled. As a result, the operator can change the tool without risks.

Likewise if the tool works with pneumatic vacuum and air should enter through the duct 4 towards the tool.

Advantageously, therefore, in the device 1 the locking means 6 are also means for leading the pressure of the working fluid inside the tool to the atmospheric pressure and for preventing the possibility of tool activation when it is in operator's hands.

This is a particularly compact solution; since there isn't the second ring described in Italian patent IT 1413748, the device 1 can be realized with minimum axial dimensions and low weight, these characteristics being very highly appreciated by users.

FIGS. 5 to 7D show a second embodiment of the device 1' that differs from the first one in the following features.

The lengths 41 and 41' are not parallel to each other. In particular, the length 41' is radial and the length 41 is made blind by the grub screw 8 and is convergent with respect to the length 41'. At the section plane C-C, the axial lengths 42' and 42" are parallel and close to each other. The circular lock ring 6' is provided with the niche 7' shaped as well shown in FIG. 6, in which the gasket 10' is located.

Unlike the first embodiment 1, the by-pass surface countersink 13' formed on the lock ring 6' extends radially to open at the outer edge, and not at the inner one, of the lock ring.

In FIGS. 5 to 6 the device 1' is shown with the lock ring 6' in the locked position. Also in this example, the niche 7' fluidically connects the two branches of the duct 4. The position of the niche 7' is shown in dotted lines in FIG. 5. In this position the surface countersink 13' is not working.

FIGS. 7 to 7D show the device 1' in the unlocked position, i.e. with the lock ring 6' rotated with respect to the position shown in the previous figures. Noting in particular FIG. 7, the surface countersink 13' is shown in dotted lines and fluidically connects the length 42' directly to the atmosphere in order to relieve excess pressure from the tool, as explained above for the first example.

To sum up, then, the device 1, 1' according to the present invention allows the tool to be changed without putting in danger the operator's safety: the same lock ring 6 the operator has to operate to lock and unlock the tool is also useful for leading the pressure of the working fluid inside the tool to equalize the atmospheric pressure, before the tool is separated from the device 1.

It is important to specify that the device 1 or 1' shown in figures comprises only one split duct 4 designed to allow pressures to be balanced, but it is only an example; in general the device may comprise more than one split duct 4, depending on the need and the size of the device 1 or 1'.

Figures show, by choice, the simplest case.

What is claimed is:

1. A device, for connecting pneumatic tools to manipulators, comprising:
   a) a main body, fixable to a manipulator, provided with one or more seats for accommodating corresponding coupling portions of a tool;
   b) at least one duct for feeding or suctioning a working fluid to/from the tool, wherein the duct extends through the main body of the device;
   c) a single lock ring to engage the coupling portions of the tool, wherein the lock ring is movable with respect to the main body between a locked position, at which the coupling portions of the tool are locked in the corresponding seats of the main body, and an unlocked position, at which the coupling portions of the tool are free to disengage the corresponding seats of the main body; wherein in the locked position the lock ring keeps the duct pneumatically open to allow the flow of the working fluid, and wherein in the unlocked position the lock ring keeps the duct pneumatically closed to prevent the flow of the working fluid.

2. The device according to claim 1, wherein in the unlocked position the lock ring fluidically connects the tool to the atmosphere in order to achieve the deactivation of the tool before the tool is disconnected from the device.

3. The device according to claim 1, wherein the lock ring is rotatably assembled on the main body and provided, per each accommodating seats, with through openings each consisting of a substantially circular hole joined to an eyelet whose width is lower than the diameter of the circular hole, wherein in each hole of the lock ring a corresponding coupling pin of the tool can be inserted, and wherein the lock ring can be rotated with respect to the main body between an unlocked position, at which the respective holes are aligned with the accommodating seats and the pins of the tool can be inserted and released to engage and disengage the tool to/from the device, and a locked position, at which the respective eyelets are aligned with the accommodating seats to engage a narrowing section of the pins of the tool and to lock them just in the respective accommodating seats, to prevent the tool from disengaging from the device.

4. The device according to claim 3, wherein the lock ring comprises a surface countersink, or channel, obtained at the face abutting against the main body, and wherein the countersink extends for a length sufficient to intercept, in the unlocked position of the lock ring, a length of the respective duct connected to the tool, and leads at the inner or outer edge of the lock ring, wherein the countersink along with the main body define a working fluid vent to the atmosphere.

5. A device, for connecting pneumatic tools to manipulators, comprising:
   a) a main body, fixable to a manipulator, provided with one or more seats for accommodating corresponding coupling portions of a tool;
   b) at least one duct for feeding or suctioning a working fluid to/from the tool, wherein the duct extends through the main body of the device;
   c) an engaging mechanism to engage the coupling portions of the tool, wherein the engaging mechanism is movable with respect to the main body between a locked position, at which the coupling portions of the tool are locked in the corresponding seats of the main body, and an unlocked position, at which the coupling portions of the tool are free to disengage the corresponding seats of the main body; wherein in the locked position the engaging mechanism keeps the duct pneumatically open to allow the flow of the working fluid, and wherein in the unlocked position the engaging mechanism keeps the duct pneumatically closed to prevent the flow of the working fluid, wherein the duct splits in two branches, a first branch communicating with the tool constrained to the device but not communicating with an outside line feeding or suctioning the working fluid, and a second branch communicating with an outside line feeding or suctioning the working fluid but not communicating with the tool, and wherein the engaging mechanism is provided with a passage for the working fluid that fluidically connects the two branches of the duct automatically, or the passage isolates the two branches, when the engaging mechanism is in the locked or unlocked position, respectively.

6. The device according to claim 5, wherein the two branches of the duct have lengths leading at the surface of the main body on which the engaging mechanism is, and wherein per each split duct the engaging mechanism comprises a niche, or compartment, obtained at the face abutting against the main body of the device and extending along an arc of a circle, wherein in the locked position of the engaging mechanism the niche intercepts both the branches of the duct, thereby allowing the fluidic communication between them, and in the unlocked position of the engaging mechanism the niche does not intercept at least one of the two branches, or does not intercept any branch of the respective duct, the latter remaining closed, thereby configuring the engaging mechanism also as a valve.

7. The device according to the claim 6, wherein between the niche and the corresponding duct there is a sealing gasket.

8. The device according to claim 5, wherein the main body is toroidal or disc-shaped, and extends along a longitudinal axis (X-X) corresponding to the tool alignment axis with respect to the device, and wherein the split duct comprises: a first branch defined by a first length transversal with respect to the longitudinal axis (X-X) and closed towards an outside line feeding or suctioning the working fluid and by a second axial length opening towards the tool or towards a nozzle assembled on the main body and a second branch defined by a first length also transversal with respect to the longitudinal axis (X-X) and open towards an outside line feeding or suctioning the working fluid and by a second axial length leading at the surface of the main body facing the engaging mechanism.

9. The device (1) according to claim 8, wherein the first branch of the duct is closed towards the outside of the device by a grub screw inserted during the assembling step, or alternatively by a metal bead, a weld, or a sealant.

10. The device according to claim 5, wherein the split ducts are more than one and the engaging mechanism acts as a valve able to open and close all split ducts contemporaneously.

11. A device, for connecting pneumatic tools to manipulators, comprising:

a) a main body, fixable to a manipulator, provided with one or more seats for accommodating corresponding coupling portions of a tool;
b) at least one duct for feeding or suctioning a working fluid to/from the tool, wherein the duct extends through the main body of the device;
c) an engaging mechanism to engage the coupling portions of the tool, wherein the engaging mechanism is movable with respect to the main body between a locked position, at which the coupling portions of the tool are locked in the corresponding seats of the main body, and an unlocked position, at which the coupling portions of the tool are free to disengage the corresponding seats of the main body; wherein in the locked position the engaging mechanism keeps the duct pneumatically open to allow the flow of the working fluid, and wherein in the unlocked position the engaging mechanism keeps the duct pneumatically closed to prevent the flow of the working fluid, wherein the engaging mechanism is provided with at least one vent intended for intercepting a corresponding duct when the engaging mechanism is in the unlocked position, in order to fluidically connect the tool with the atmosphere and obtain said deactivation.

* * * * *